United States Patent [19]

Ivanov et al.

[11] 4,136,422
[45] Jan. 30, 1979

[54] TENSIONING AND LOCKING STRAP DEVICE

[76] Inventors: Jury N. Ivanov, Oruzheiny pereulok, 5-9, kv. 60; Leonid I. Suris, Smolnaya ulitsa, 31, kv. 85; Nikolai M. Zaitsev, Smolnaya ulitsa, 31, kv. 116; Vladimir G. Shikin, Preobrazhensky val, 14, kv. 8, all of Moscow, U.S.S.R.

[21] Appl. No.: 789,863

[22] Filed: Apr. 22, 1977

[51] Int. Cl.² .................. A44B 11/10; A44B 11/25; B61D 45/00; B64D 9/00

[52] U.S. Cl. .................. 24/170; 24/68 E; 24/171; 105/477; 244/118 R; 280/744; 254/77

[58] Field of Search .......... 24/68 CD, 68 E, 68 R, 24/68 T, 170, 171, 194, 195, 196, 197, 198, 199, 200, 270, 271; 105/469, 477; 244/118 R, 151 B; 280/744; 254/77, 78, 79, 164

[56] References Cited

U.S. PATENT DOCUMENTS

| 2,457,010 | 12/1948 | Thedick | 254/77 X |
|---|---|---|---|
| 2,715,008 | 8/1955 | Huber | 105/477 |
| 3,099,055 | 7/1963 | Huber | 105/469 |
| 3,341,250 | 9/1967 | Rasmussen | 280/744 X |
| 3,414,291 | 12/1968 | Jantzen | 280/744 |
| 3,486,203 | 12/1969 | Cadiou | 24/196 |
| 3,703,024 | 11/1972 | Johnson | 24/196 X |

*Primary Examiner*—Albert J. Makay
*Assistant Examiner*—Howard Beltran
*Attorney, Agent, or Firm*—Robert E. Burns; Emmanuel J. Lobato; Bruce L. Adams

[57] ABSTRACT

A device for tensioning and locking air cargo net straps. A frame has laterally spaced side webs having elongated grooves in which is slidably mounted a wedge member. A clamping lever cooperates with the wedge member in clamping a free end portion of a strap disposed therebetween and reversely over the wedge member. A control lever pivotally mounted on the frame has laterally spaced lugs on which is mounted a roller that is moved to a position engaging the clamping lever to clamp the strap when the control lever is in a locking position. The control lever moves the roller away from the clamping lever to release the strap when it is moved to an unlocked position.

3 Claims, 6 Drawing Figures

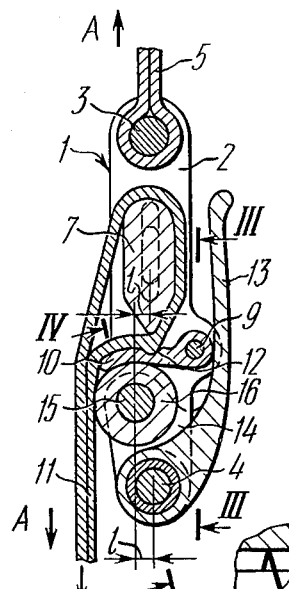
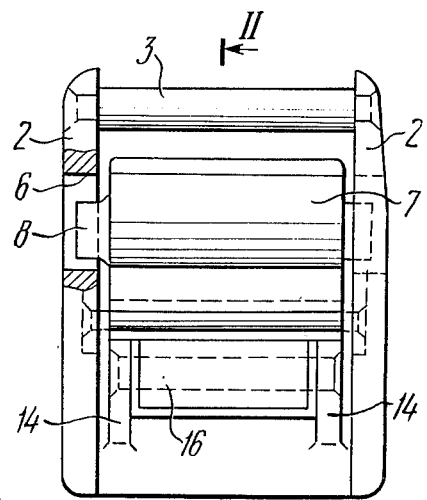
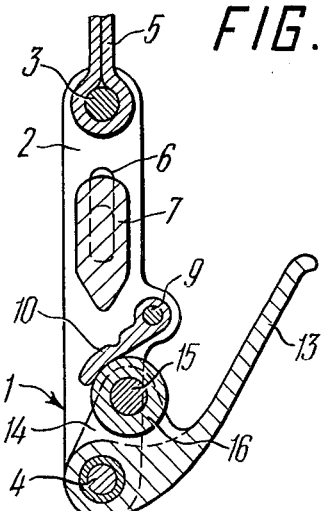
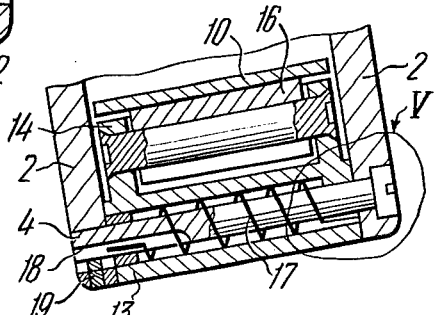
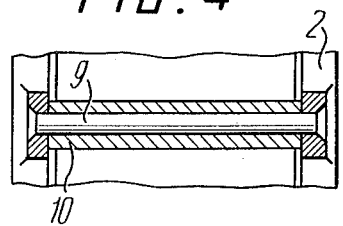
FIG.1  FIG.2  FIG.3  FIG.4  FIG.5  FIG.6

TENSIONING AND LOCKING STRAP DEVICE

BACKGROUND OF THE INVENTION

The present invention relates to air cargo transportation, and more particularly to devices for tensioning and locking air cargo net straps.

The device of the present invention can most advantageously be used as part of the equipment in the baggage and cargo holds of aircraft.

A known device for tensioning and locking air cargo net straps, fitted to the cargo nets in the cargo holds of aircraft incorporates a case composed of parallel webs interconnected by two shafts and rigidly attached by means of a square thrust shank. In addition, the device comprises a spring-loaded two-arm lever arranged on a shaft between the webs near the thrust shank. One arm of the lever, facing the thrust shank, extends radially and is provided with small teeth. The center of the lever arm's radial edge is offset in relation to the hinge axis of the lever.

The fixed end of the cargo net strap is attached to the shaft at the shank end located farther from the thrust shank, and the free end of the strap is passed above the other shaft and around the thrust shank. The strap brought above the thrust shank contacts the teeth of the lever and turns the latter about the axis thereof. Inasmuch as the teeth are located on an eccentric circumference, they sink in the strap body when the lever is turned, and lock the strap inside the device.

In order to unlock the device and to release the free strap end, the free end of the lever must be pushed. Hence, the lever turns and disengages the teeth from the strap which can easily be pulled out of the device. The spring of the lever moves it back to the initial position.

Disadvantages inherent in the known device include excessive wear of the straps due to the action of the lever teeth, and inadequate safety in locking the device.

Another known device for tensioning and locking cargo mooring straps comprises a U-shaped case whereto a lever embracing the case is pivoted by means of a shaft. Like the case, the lever is U-shaped. The fixed strap end is fastened to the bottom case section by means of a shaft. The lugs on the side surfaces of the top case section mount another shaft, whereas the side walls are provided with radially extending projections formed by a part of the circumference with the centre thereof aligned with that of a hole accommodating the lever shaft. There are recesses located between the shaft-mounting lugs and the radially extending projections. Oval slots in the sides of the lever carry a movable shaft, and the top lever end receives a cross piece.

For threading the strap into the device, the cross piece is moved down and turned. Hence, the lever shaft slides over the radial lugs of the case.

The free strap end introduced into the device embraces the lever hinge shaft and the other lever shaft, and runs outside above the cross piece of the lever. The strap placed to a stretched position is tensioned fully after the lever is transferred from the bottom to the top position, whereat the lever shaft enters the recesses between the radial lugs and the shaft-mounting lugs, thereby clamping the lever in the uppermost locked position. Then the free strap end is passed through the slot between the outer surface of the lever and the shaft mounted in the side lugs of the case for secure locking of the lever in the closed position.

To unlock the device, the free strap end is pulled upward, then the cross piece of the lever is pushed and turned downward. The lever placed to the lower-most position permits pulling the free strap end out of the case of the device.

Disadvantages inherent in this device are as follows:
(a) with a load applied to the straps, considerable force is required for unlocking the device;
(b) inadvertent unlocking of the device is possible because mutual location of the shaft and lever shaft does not provide for safe locking of the closed device components if the strap end is not fitted into the device which is quite possible in service;
(c) locking of the device by the strap end is not quite suitable for use because the lever seizes the strap end, and thereby impedes unlocking of the device during opening.

SUMMARY OF THE INVENTION

It is an object of the present invention to obviate the above disadvantages inherent in the devices for tensioning and locking air cargo net straps.

Another object of the invention is to facilitate the operation of strap tensioning and locking devices.

Still another object of the invention is to cut down the loading and unloading time during air cargo transportation.

Yet another object of the invention is to provide a device for tensioning and locking cargo net straps, so designed as to permit easy unlocking of the cargo net straps held by the locked device with minimum force required to operate the control handle when a heavy load is applied to the straps.

These and other objects are attained by a device for tensioning and locking air cargo net straps, comprising a case composed of parallel webs interconnected by shafts with a wedge member being arranged between the webs for clamping the cargo net straps, according to the invention.

Also incorporates a lever mounted on an individual shaft between the webs near the movable wedge member and serving to clamp the cargo net strap to the wedge member when the device is in the locked position. A movable control handle is arranged on the case shaft facing the sharp edge of the wedge member, with a shaft being mounted in lugs on the control handle, carrying a roller which interacts with the lever and clamps the latter to the strap and to the movable wedge member when the device is in the locked position. The roller shaft is offset in relation to the longitudinal axis of the movable wedge member in such a manner that the control handle cannot unlock the device inadvertently when the device is set to the locked position.

It is expedient that the lever of the device for tensioning and locking air cargo net straps should have its surface mating with the control handle roller rounded, the radius of the curvature is equal to that of the roller. This feature will provide for easy unlocking of the device when a heavy load acts upon the cargo net strap.

It is preferable that the control handle be loaded with a retracting spring mounted on the control handle hinge shaft, one end of the spring being attached to the control handle, while the other end is fixed to a shaft stationary relative to the case. Thus, the control stick will easily return to the position whereto it is set during locking of the device.

BRIEF DESCRIPTION OF THE DRAWINGS

The invention will now be described in greater detail with reference to a preferred embodiment thereof taken in conjunction with the accompanying drawings, wherein:

FIG. 1 is a general view of a device for tensioning and locking air cargo net straps;

FIG. 2 is a view taken along line II—II of FIG. 1;

FIG. 3 is a view taken along line III—III of FIG. 2;

FIG. 4 is a view taken along line IV—IV of FIG. 2;

FIG. 5 is detail V of FIG. 4;

FIG. 6 shows schematically the mutual arrangement of components in the device for tensioning and locking air cargo net straps of flight vehicles, with the device being set to the unlocked position.

DESCRIPTION OF THE PREFERRED EMBODIMENT

The device for tensioning and locking air cargo net straps is intended for mounting on cargo nets installed in cargo and baggage holds of aircraft.

Referring now to FIGS. 1 and 2, the device for tensioning and locking cargo net straps comprises a case 1 incorporating two side webs 2 linked to each other by shafts 3 and 4. The shaft 3 serves for fastening a free strap end 5.

The webs 2 have longitudinal slots 6. A movable wedge member 7 with lugs 8 is arranged between the webs 2. The lugs 8 of the wedge member 7 enter the longitudinal slots 6 so that the wedge member is allowed to move along the slots 6. The edge of the wedge member 7 facing the shaft 4 is sharp, whereas the opposite end is rounded radially.

A lever 10 mounted on a shaft 9 is arranged between the webs 2 near the movable wedge member 7. The lever 10 is seated on the shaft 9 (FIG. 3) so as to permit contact between the lever 10 and a free cargo net strap end 11 (FIG. 2) passed around the movable wedge member 7. The surface of the lever 10 facing the movable wedge member 7 has a lateral recess 12 located so that the sharp edge of the wedge member 7 enters the recess when the free cargo net strap end 11 is clamped to the wedge member.

A control handle 13 pivoted on the shaft 4 is essentially a one-arm lever having side lugs 14.

The lugs 14 of the control handle 13 have a shaft 15 mounting a roller 16. The roller 16 is positioned so as to interact with the lever 10 and to press it against the free strap end 11 and against the movable wedge member 7 when the device is in the locked position.

The shaft 15 of the roller 16 is offset from the longitudinal axis of the movable wedge member a distance 1 in a direction opposite to the position to which the handle 13 is placed when the device is locked (as shown in FIG. 2). Such an arrangement of the shaft 15 of the roller 16 prevents spontaneous unlocking of the handle 13.

These structural features of the proposed device for tensioning and locking the cargo net straps 11 provide for safe locking of the free cargo net strap ends in the locked position of the device (FIG. 2) and preclude inadvertent unlocking of the device by the control handle 13.

The surface of the lever 10 mating with the roller 16 of the control handle 13 is rounded at a radius equal to that of the roller 16.

Consequently, a little force is sufficient to unlock the device when a heavy load acts upon the straps of the cargo net.

The control handle 13 is furnished with a retracting spring 17 (FIG. 4) mounted on the hinge shaft 4 of the control handle 13. One end of the spring 17 is fixed to the control handle 13, and the other end is attached to the shaft 4 stationary relative to the case 1.

The spring 17 is arranged inside the control stick 13 and is seated on the shaft 4. The shaft 4 is made as a bolt provided with a longitudinal groove 18 in the tail section. One end of the spring 17 is inserted into the groove 18, and the other end of the spring 17 enters a hole in the control handle 13 (as shown in FIG. 5).

A threaded lockpin 19 prevents turning of the shaft 4. The lockpin 19 passes through a hole in the web 2 of the case 1 and is screwed into the body of the shaft 4.

The spring 17 permits resetting the handle 13 to a position which it occupies when the device is locked.

The device operates as follows. The handle 13 (FIG. 6) is turned manually to unlock the device for tensioning and locking cargo net straps. As a result, the retracting spring 17 (FIG. 5) is wound up. The roller 16 (FIG. 6) moves off together with the control handle 13, and the free end of the lever 10 travels downward so that the gap between the movable wedge member 7 and the lever 10 widens.

The free strap end 11 (FIG. 2) is introduced into the device for tensioning and locking cargo net straps, passed around the movable wedge member 7 and over the surface of the lever 10.

After the free strap end 11 is stretched, the control handle 13 is turned to a position which it occupies when the device is locked. Now, the roller 16 lifts the free end of the lever 10, and the recess 12 thereof is placed opposite the free strap end 11 and opposite the sharp edge of the movable wedge member 7, with the result that the free strap end 11 is locked inside the device.

When an external force acts on the cargo net straps in the direction shown by arrow A, the movable wedge member 7 presses the cargo net strap 11 against the surface of the lever 10 and locks it securely. The roller 16 of the control handle 13, offset in relation to the longitudinal axis of the movable wedge member 7 to distance 1 precludes inadvertent unlocking of the device.

In order to unlock the device, the control handle 13 (FIG. 6) must be turned again, whereby the roller 16 running under the lever 10 permits it to turn and to release the strap end 11. A little force is sufficient for turning the handle 13 because the roller 16 revolving under the lever 10 has a low rolling friction factor.

What is claimed is:

1. A strap tensioning and locking device comprising, a frame having two laterally spaced side webs having opposed elongated grooves, a wedge member extending transversely between the side webs and movable axially on said webs in the grooves, a clamping lever pivotally mounted between the side webs to press a free end portion of a strap received between it and the wedge member reversely folded over the wedge member to clamp the strap therebetween, a control lever pivotally mounted on said frame and having two lugs spaced laterally, said control lever being operable to a locking position for effecting clamping of the strap and to an unlocked position releasing the strap, an elongated roller shaft extending transversely of the frame between the lugs, a pivot for said control lever disposed in a plane spaced laterally from a plane passing through an axis of rotation of said roller, said pivot and roller being disposed spaced relatively for said roller to engage the clamping lever and move it toward said wedge member for clamping said free end portion of said strap when disposed between the wedge member and clamping lever and said control lever is in said locking position and to move the roller in a direction away from said wedge member when said control lever is in said unlocked position to release said clamping lever and thereby release said strap.

2. A strap tensioning and locking device according to claim 1, in which said clamping lever comprises a recess on a side thereof facing said wedge member, said wedge member having a tapered end configured to press against said free end portion of said strap and press it into said recess when said control lever is disposed in said locking position.

3. A strap tensioning and locking device according to claim 1, including resilient means biasing said control lever to said locking position.

* * * * *